United States Patent
Kubo et al.

(10) Patent No.: US 8,259,023 B2
(45) Date of Patent: *Sep. 4, 2012

(54) ANTENNA COIL AND ANTENNA DEVICE (75) Inventors: Hiroyuki Kubo, Kanazawa (JP);
Hiromitsu Ito, Hakusan (JP); Kuniaki Yosui, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 527 days.

This patent is subject to a terminal disclaimer.

(21) Appl. No.: 12/357,546

(22) Filed: Jan. 22, 2009

(65) Prior Publication Data

US 2009/0121955 A1     May 14, 2009

Related U.S. Application Data (63) Continuation of application No. PCT/JP2007/061771, filed on Jun. 12, 2007.

(30) Foreign Application Priority Data

Aug. 9, 2006 (JP) ................................. 2006-217198

(51) Int. Cl.
*H01Q 7/08* (2006.01)
(52) U.S. Cl. ......................... 343/788; 343/787; 343/702
(58) Field of Classification Search .................. 343/787, 343/788, 702
See application file for complete search history.

(56) References Cited

U.S. PATENT DOCUMENTS

| | | | | |
|---|---|---|---|---|
| 5,396,698 A | * | 3/1995 | Orthmann et al. | 29/600 |
| 5,638,080 A | | 6/1997 | Orthmann et al. | |
| 5,870,065 A | * | 2/1999 | Kanba et al. | 343/895 |
| 6,396,455 B1 | * | 5/2002 | Ely et al. | 343/788 |
| 7,511,679 B2 | * | 3/2009 | Araki et al. | 343/788 |
| 2003/0226892 A1 | | 12/2003 | Arimura | |
| 2005/0007296 A1 | * | 1/2005 | Endo et al. | 343/895 |
| 2005/0162331 A1 | | 7/2005 | Endo et al. | |

FOREIGN PATENT DOCUMENTS

EP     2 040 202 A1     3/2009
EP     2 040 334 A1     3/2009

(Continued)

OTHER PUBLICATIONS

Official Communication issued in corresponding Japanese Patent Application No. 2007-557262, mailed on Jun. 22, 2010.

(Continued)

*Primary Examiner* — Hoang V Nguyen
(74) *Attorney, Agent, or Firm* — Keating & Bennett, LLP (57) ABSTRACT An antenna coil is obtained by winding a flexible substrate around a magnetic core. Conductors are provided on the flexible substrate, whereby a first coil portion and a second coil portion are provided on either side of the magnetic core except for in a middle portion. A non-winding portion including no conductors is provided between the first coil portion and the second coil portion on a main surface of the magnetic core.

13 Claims, 6 Drawing Sheets

FOREIGN PATENT DOCUMENTS

| | | | |
|---|---|---|---|
| GB | 2 280 089 | A | 1/1995 |
| JP | 63-115403 | A | 5/1988 |
| JP | 64-013710 | A | 1/1989 |
| JP | 10-98405 | A | 4/1998 |
| JP | 10-185962 | A | 7/1998 |
| JP | 11-225097 | A | 8/1999 |
| JP | 2002-252518 | A | 9/2002 |
| JP | 2003-22912 | A | 1/2003 |
| JP | 2003-294868 | A | 10/2003 |
| JP | 2004-153649 | A | 5/2004 |
| JP | 2004-166175 | A | 6/2004 |
| JP | 2005-333244 | A | 12/2005 |

OTHER PUBLICATIONS

Official Communication issued in International Patent Application No. PCT/JP2007/061771, mailed on Sep. 11, 2007.

Official Communication issued in corresponding European Patent Application No. 07745058.3, mailed on Oct. 6, 2010.

Official Communication issued in corresponding Japanese Patent Application No. 2007-557262, mailed on Mar. 8, 2011.

Official Communication issued in corresponding European Patent Application No. 07745058.3, mailed on May 25, 2011.

Official Communication issued in corresponding Chinese Patent Application No. 200780029705.4, mailed on Nov. 3, 2011.

* cited by examiner

ANTENNA COIL AND ANTENNA DEVICE

BACKGROUND OF THE INVENTION

1. Field of the Invention

The present invention relates to an antenna coil for mobile communication and an antenna device including the antenna coil.

2. Description of the Related Art

In recent years, there has been an increased use of contactless communication in which an electromagnetic induction method is used. In such contactless communication, a portable electronic device, such as a mobile terminal, and a reader/writer each have an antenna and exchange data with each other. An antenna included in the portable electronic device must be highly sophisticated, low priced, and miniaturized. In order to meet these requirements, antenna coils are typically used.

Figure 11:
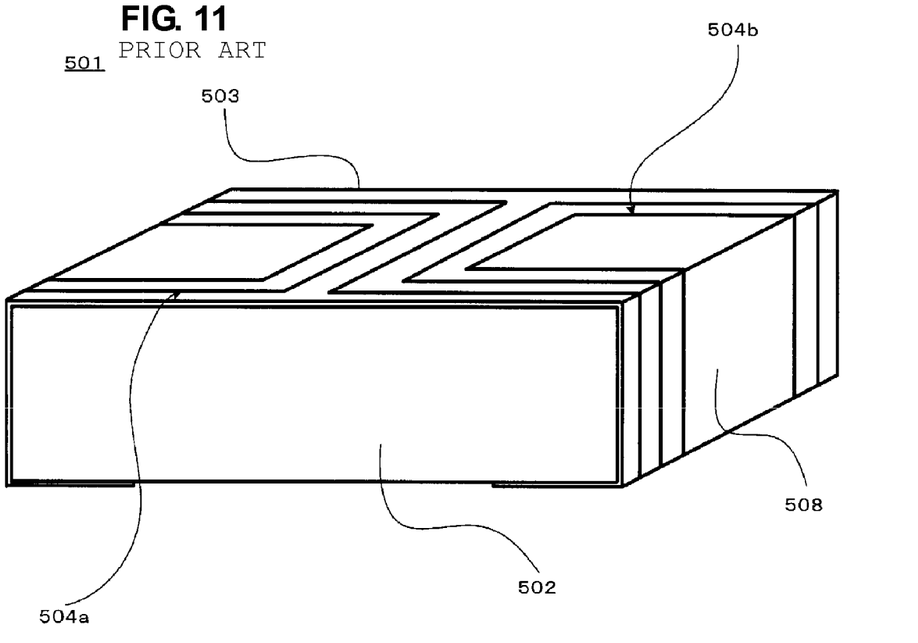
FIG. 11 is a perspective view illustrating an antenna coil in the related art.
Figure 12:
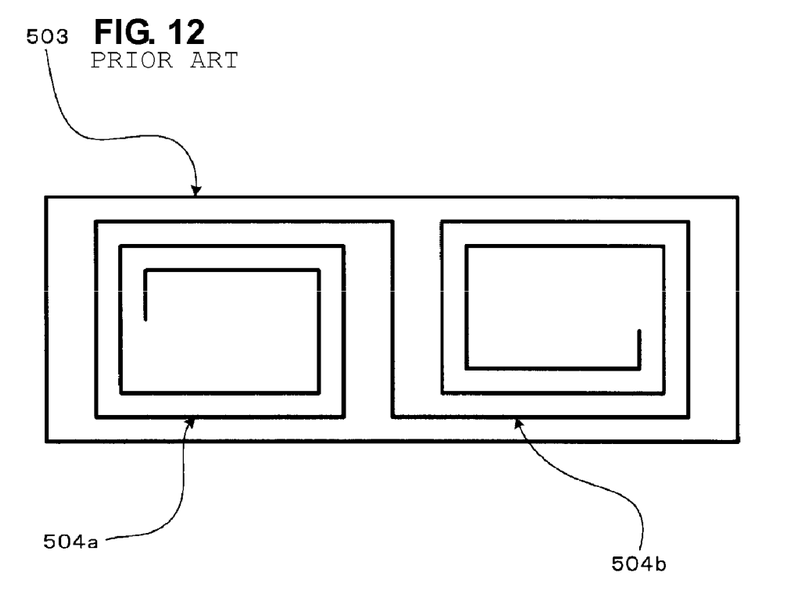
FIG. 12 is a plan view illustrating a flexible substrate in the related art.

Japanese Unexamined Patent Application Publication No. 2003-22912 discloses an antenna coil in which a flexible substrate including a coil conductor disposed thereon is mounted on a magnetic core. FIG. 11 is a perspective view illustrating a configuration of an antenna coil disclosed in Japanese Unexamined Patent Application Publication No. 2003-22912. A single flexible substrate 503 including a coil conductor disposed thereon is mounted on a magnetic core 502. FIG. 12 is a plan view illustrating a main surface of the flexible substrate 503 before the flexible substrate 503 is mounted on the magnetic core 502. In Japanese Unexamined Patent Application Publication No. 2003-22912, the flexible substrate 503 is bent to produce a plurality of surfaces. The surfaces of the flexible substrate 503 are individually bonded to the main surface and side surfaces of the magnetic core 502. Thus, by mounting the flexible substrate 503 on the magnetic core 502, a first coil portion 504a and a second coil portion 504b are provided on the magnetic core 502. Here, the coil conductor is defined by a line provided on the flexible substrate, and the coil portion is defined by a spiral portion of the coil conductor.

The antenna coil disclosed in Japanese Unexamined Patent Application Publication No. 2003-22912 is usually provided on a circuit substrate, such that the main surface of the antenna coil is adjacent to the main surface of the circuit substrate. When an antenna device including such an antenna coil is used in a mobile terminal, a user of the mobile terminal holds the mobile terminal over a reader/writer such that the main surface of the mobile terminal, which is parallel or substantially parallel to the circuit substrate therein, overlaps the main surface of the reader/writer in plan view.

However, in a mobile terminal including the antenna coil disclosed in Japanese Unexamined Patent Application Publication No. 2003-22912, if the mobile terminal is held over a reader/writer as described above, it may not be able to communicate with the reader/writer or a communication range between the mobile terminal and the reader/writer may be reduced. That is, an antenna coil 501 disclosed in Japanese Unexamined Patent Application Publication No. 2003-22912 can be interlinked with a magnetic flux parallel or substantially parallel to the main surface of the antenna coil 501, but cannot be interlinked with a magnetic flux perpendicular or substantially perpendicular to the main surface of the antenna coil 501.

There are two reasons for this. The first reason is that a coil conductor is provided on substantially the entire main surface of the antenna coil 501. As a result, a magnetic flux with which the antenna coil 501 can be interlinked is limited. The second reason is that the winding directions of the first coil portion 504a and the second coil portion 504b with respect to the coil axis are the same. As a result, even if a magnetic flux enters the main surface of the antenna coil 501, at the time the magnetic flux passes through the coil axis of the first coil portion 504a and the second coil portion 504b, the directions of magnetic fluxes passing through the first coil portion 504a and the second coil portion 504b are opposite to one another. Accordingly, voltages are induced in opposite directions, and the induced voltages substantially cancel each other. This makes it difficult to maintain an optimum communication state.

SUMMARY OF THE INVENTION

To overcome the problems described above, preferred embodiments of the present invention provide an antenna coil that enables communication with improved sensitivity by being interlinked with a magnetic flux flowing in a direction perpendicular or substantially perpendicular to the main surface of the antenna coil.

An antenna coil according to a preferred embodiment of the present invention includes a planar magnetic core, a flexible substrate including a surface on which conductors are disposed and being wound around the magnetic core, a fist coil portion defined by some of the conductors and having a coil axis parallel or substantially parallel to a main surface of the magnetic core, a second coil portion defined by some of the conductors, having a coil axis parallel or substantially parallel to the main surface of the magnetic core, being connected to the first coil portion, and having a winding direction opposite to that of the first coil portion, and a non-winding portion provided between the first coil portion and the second coil portion on the main surface of the magnetic core and including no conductors.

In the antenna coil, preferably, at least a middle portion on the main surface of the magnetic core defines the non-winding portion including no conductors.

Furthermore, preferably, no conductor is disposed on a side surface of the magnetic core which is arranged in a direction in which the first coil portion and the second coil portion are arranged.

Another magnetic core may preferably be arranged at a side surface of the magnetic core which is arranged in a direction in which the first coil portion and the second coil portion are arranged.

Preferably, the coil axis of the first coil portion and the coil axis of the second coil portion are the same or substantially the same.

The non-winding portion may preferably be provided on two main surfaces of the magnetic core, and a shielding electrode may preferably be provided on one of the non-winding portions.

The first coil portion and the second coil portion may preferably be connected to each other by a connection conductor that is one of the conductors.

Two or more connection conductors may preferably be provided. It is preferable that each of the connection conductors includes a notch portion.

The magnetic core may preferably include at least one notch portion.

An antenna device according to a preferred embodiment of the present invention preferably includes the above-described antenna coil, and a circuit substrate on which the antenna coil is mounted such that a main surface of the antenna coil faces a main surface of the circuit substrate.

When a length of the antenna coil in a direction in which a first coil portion and a second coil portion are arranged is denoted as X and a length of the circuit substrate in the direction in which the first coil portion and the second coil portion are arranged is denoted as Y, the inequality $Y \geq X \geq 0.8Y$ is preferably satisfied.

A non-winding portion of the antenna coil is preferably provided on at least one centerline which bisects sides of the main surface of the circuit substrate.

Furthermore, conductors may preferably be provided on the main surface of the circuit substrate.

An antenna coil according to various preferred embodiments of the present invention achieves the following advantages.

By winding a flexible substrate around a magnetic core, an antenna coil can be easily produced. By providing a non-winding portion including no conductors between a first coil portion and a second coil portion on the main surface of the magnetic core and making the winding directions of the first and second coil portions opposite to each other, an antenna coil can be interlinked with a magnetic flux flowing in a direction perpendicular or substantially perpendicular to the main surface of the antenna coil. Consequently, communication sensitivity is improved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
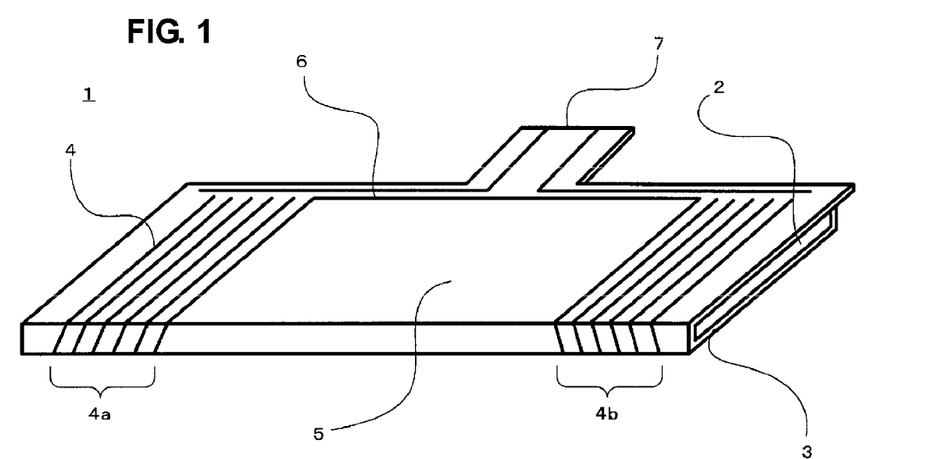
FIG. 1 is a perspective view illustrating an antenna coil according to a first preferred embodiment of the present invention.
Figure 2:
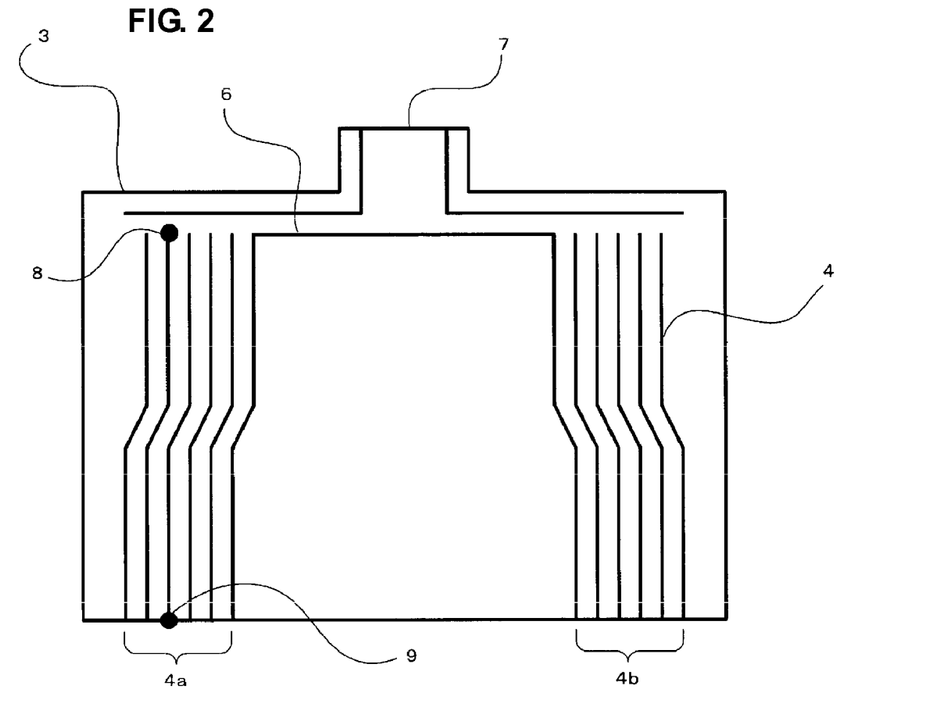
FIG. 2 is a plan view illustrating a flexible substrate according to the first preferred embodiment of the present invention.

An antenna coil according to a first preferred embodiment of the present invention will be described with reference to FIGS. 1 and 2. FIG. 1 is a perspective view illustrating an antenna coil according to the first preferred embodiment. FIG. 2 is a plan view illustrating a flexible substrate before the flexible substrate is wound on a magnetic core.

As illustrated in FIG. 1, an antenna coil 1 according to the first preferred embodiment includes a planer magnetic core 2 and a single flexible substrate 3 wound around the magnetic core 2. A first coil portion 4a and a second coil portion 4b are provided on either side of the antenna coil 1. A non-winding portion 5 including no conductors is provided between the first coil portion 4a and the second coil portion 4b on the main surface of the antenna coil 1. The main surface of the antenna coil 1 is symmetric or substantially symmetric with respect to a centerline bisecting the sides of the main surface of the antenna coil 1 in the longitudinal direction. Accordingly, the non-winding portion 5 is provided in the middle portion of the main surface which includes the centerline. No conductors are provided on the side surfaces of the magnetic core 2 which are arranged in a direction in which the first coil portion 4a and the second coil portion 4b are arranged.

For example, the magnetic core 2 is preferably made of ferrite, and is about 40 mm long and about 10 mm wide with a thickness of about 1.5 mm.

Conductors 4 are provided on a surface of the flexible substrate 3. Using the conductors 4, the first coil portion 4a and the second coil portion 4b are provided on either side of the magnetic core in the longitudinal direction except for the middle portion. The first coil portion 4a and the second coil portion 4b are preferably obtained by winding approximately six turns of the conductor 4, for example, on either side of the magnetic core 2 in the longitudinal direction leaving a margin of about 1 mm in which the magnetic core 2 is exposed. The winding directions of the first coil portion 4a and the second coil portion 4b are opposite to one another, and the coil axes thereof are the same and are parallel or substantially parallel to the longitudinal direction of the magnetic core 1. The first coil portion 4a and the second coil portion 4b are connected in series by a connection conductor 6 to define a single coil.

FIG. 2 illustrates the flexible substrate 3 before the flexible substrate 3 is wound around the magnetic core 2. The flexible substrate 3 has a rectangular or substantially rectangular shape in plan view. On the upper edge of the flexible substrate 3, a protrusion portion 7 arranged to be connected to an input/output terminal is provided. The flexible substrate 3 is preferably made of a polyimide film, for example, and may preferably be made of a bendable electrical insulating film, such as a resin film including a glass epoxy film, for example. On a surface of the flexible substrate 3, the six conductors 4 are provided on either side of the flexible substrate 3 except for the middle portion. Each of the conductors 4 includes a bent portion in the middle portion thereof. One end of each of the conductors 4 extends to the lower edge of the flexible substrate 3, but the other end of each of the conductors 4 does not extend to the upper edge of the flexible substrate 3. The two innermost conductors, one of which is one of the six conductors 4 on the left side of the flexible substrate 3 and the other one of which is one of the six conductors 4 on the right side of the flexible substrate 3, are connected to each other by the connection conductor 6. Furthermore, conductors are provided between the upper ends of the conductors 4 and the upper edge of the flexible substrate 3, and extend to the end of the protrusion portion 7. The conductors 4 can preferably be formed by screen printing or etching, for example. The flexible substrate 3 is wound around the magnetic core 2 such that the upper end of one of the conductors 4 and the lower end of another one of the conductors 4 which is adjacent to the one of the conductors 4 overlap one another. The flexible substrate 3 is folded with the surface on which the conductors 4 are provided inside such that the magnetic core 2 is sandwiched between folded portions of the flexible substrate 3. Thereafter, overlapping points (points 8 and 9) are electrically connected to each other by soldering. Consequently, the conductors 4 define a coil. The flexible substrate 3 may preferably be fixed around the magnetic core 2 by soldering the overlapping ends of the conductors 4. However, by bonding the flexible substrate 3 and the magnetic core 2 preferably using an adhesive, for example, the coil can be more stably produced.

The antenna coil 1 according to the first preferred embodiment is preferably formed by winding the flexible substrate 3, on which the conductors 4 are provided on both side of the flexible substrate 3 except for the middle portion, around the magnetic core 2. Accordingly, non-winding portions including no conductors are provided on the main surface and opposite main surface of the antenna coil. Therefore, the antenna coil 1 can receives an externally applied magnetic flux using the main surface of the magnetic core 2. In particular, when installing the antenna coil in a mobile terminal, the antenna coil is installed such that the main surface of the antenna coil is parallel or substantially parallel to the main surface of a substrate of the mobile terminal. When contactless communication between the mobile terminal and an external reader/writer is performed, a user of the mobile terminal usually holds the main surface of the mobile terminal, which is parallel or substantially parallel to the main surface of the substrate of the mobile terminal, over the reader/writer. Accordingly, an antenna coil must be able to communicate with a reader/writer using its main surface. The antenna coil 1 illustrated in FIG. 1 having the non-winding portion 5 on its main surface meet this requirement.

After a magnetic flux has entered the non-winding portion 5 between the first coil portion 4a and the second coil portion 4b on the main surface of the magnetic core 2, the traveling direction of the magnetic flux is changed along the shape of the magnetic core 2 and then the magnetic flux passes through the coil axes of the first coil portion 4a and the second coil portion 4b. The directions of the magnetic fluxes passing through the coil axes of the first coil portion 4a and the second coil portion 4b are opposite to one another. However, since the winding directions of the first coil portion 4a and the second coil portion 4b are also opposite to one another, voltages are induced in the same or substantially the same direction in the first coil portion 4a and the second coil portion 4b. In this preferred embodiment, the coil axes of the first coil portion 4a and the second coil portion 4b are the same or substantially the same. Accordingly, the magnitude of voltages induced in the first coil portion 4a and the second coil portion 4b are equal or substantially equal. Furthermore, in this preferred embodiment, no coil conductors are provided on both side surfaces of the magnetic core 2 which are opposite to each other in a direction in which the first coil portion 4a and the second coil portion 4b are arranged. Accordingly, the magnetic fluxes that have passed through the first coil portion 4a and the second coil portion 4b are individually emitted from the side surfaces of the magnetic core 2. Thus, the path of the magnetic flux extends from the main surface to the side surfaces of the magnetic core 2. Consequently, the radiant efficiency of the antenna coil 1 is improved.

On the other hand, the externally applied magnetic flux also enters each of the side surfaces of the antenna coil 1. The magnetic fluxes, one of which has entered one of the side surfaces of the antenna coil 1 and passed through the first coil portion 4a and the other one of which has entered the other one of the side surfaces of the antenna coil 1 and passed through the second coil portion 4b, are emitted from the non-winding portion 5 provided on the main surface of the antenna coil 1. The traveling direction of each of the magnetic fluxes that have entered the side surfaces of the antenna coil 1 is different from that of the magnetic flux that has entered the main surface of the antenna coil 1. Accordingly, these magnetic fluxes cancel each other out by the sum of vectors. However, since the number of magnetic fluxes entering the main surface is significantly greater than the number of magnetic fluxes entering the side surfaces, the number of magnetic fluxes entering the antenna coil 1 and causing electromagnetic induction is significantly increased. Accordingly, communication with high sensitivity can be achieved.

In this preferred embodiment, the antenna coil 1 is formed by winding the flexible substrate 3 on the magnetic core 2. Accordingly, the antenna coil 1 can be easily produced.

In the description above, the number of turns of the conductor and the winding pitch of the conductor in the first coil portion 4a are preferably the same or substantially the same as those in the second coil portion 4b, but may be different from those in the second coil portion 4b. Each of the first coil portion 4a and the second coil portion 4b may include a single loop or two or more loops. The coil axes of the first coil portion 4a and the second coil portion 4b may not be coaxially arranged. They may be out of alignment in accordance with the shape of the magnetic core 2 or the forming method of the conductors 4. Furthermore, in this preferred embodiment, the first coil portion 4a and the second coil portion 4b are preferably connected in series, but may be connected in parallel by changing the connection point between the first coil portion 4a and the second coil portion 4b and the connection method.

Second Preferred Embodiment

Figure 3:
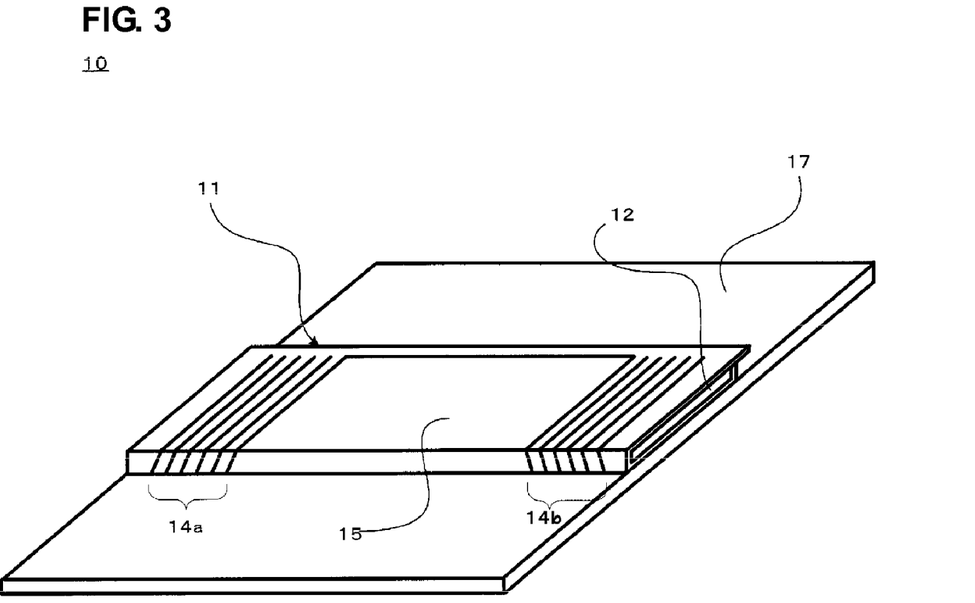
FIG. 3 is a perspective view illustrating an antenna device according to a second preferred embodiment of the present invention.

The configuration of an antenna device according to the second preferred embodiment of the present invention will be described with reference to FIG. 3. FIG. 3 is a perspective view illustrating a configuration of an antenna device according to the second preferred embodiment.

As illustrated in FIG. 3, in an antenna device 10 according to the second preferred embodiment, an antenna coil 11 is mounted on a circuit substrate 17. For example, the circuit substrate 17 has a rectangular or substantially rectangular main surface that is preferably about 90 mm long and about 40 mm wide, for example. The length of the antenna coil 11 in the longitudinal direction is the same or substantially the same as the width of the circuit substrate 17 in the width direction, and the antenna coil 11 is mounted on the circuit substrate 17 such that the end portions of the antenna coil 11 in the length direction and the end portions of the circuit substrate 17 in the width direction individually overlap one another. For example, the antenna coil 11 is fixed to the circuit substrate 17 preferably using an adhesive.

Since the configuration of the antenna coil 11 is the same or substantially the same as that of an antenna coil according to the first preferred embodiment except that the protrusion portion used to connect an input/output terminal is not included, the description thereof will be omitted. In this case, the conductor provided on the antenna coil 11 may preferably be connected to the conductor on the circuit substrate 17 so as to establish connection between the conductor provided on the antenna coil 11 and an input/output terminal via the conductor provided on the circuit substrate 17. The antenna coil 11 is disposed on the circuit substrate 17 such that the main surface of the circuit substrate 17 faces the main surface of a magnetic core 12 and the sides of the magnetic core 12 in the longitudinal direction and the side of the circuit substrate 17 in the width direction are parallel or substantially parallel to each other.

The operation of the antenna device 10 having the above-described configuration will be described below.

Figure 4:
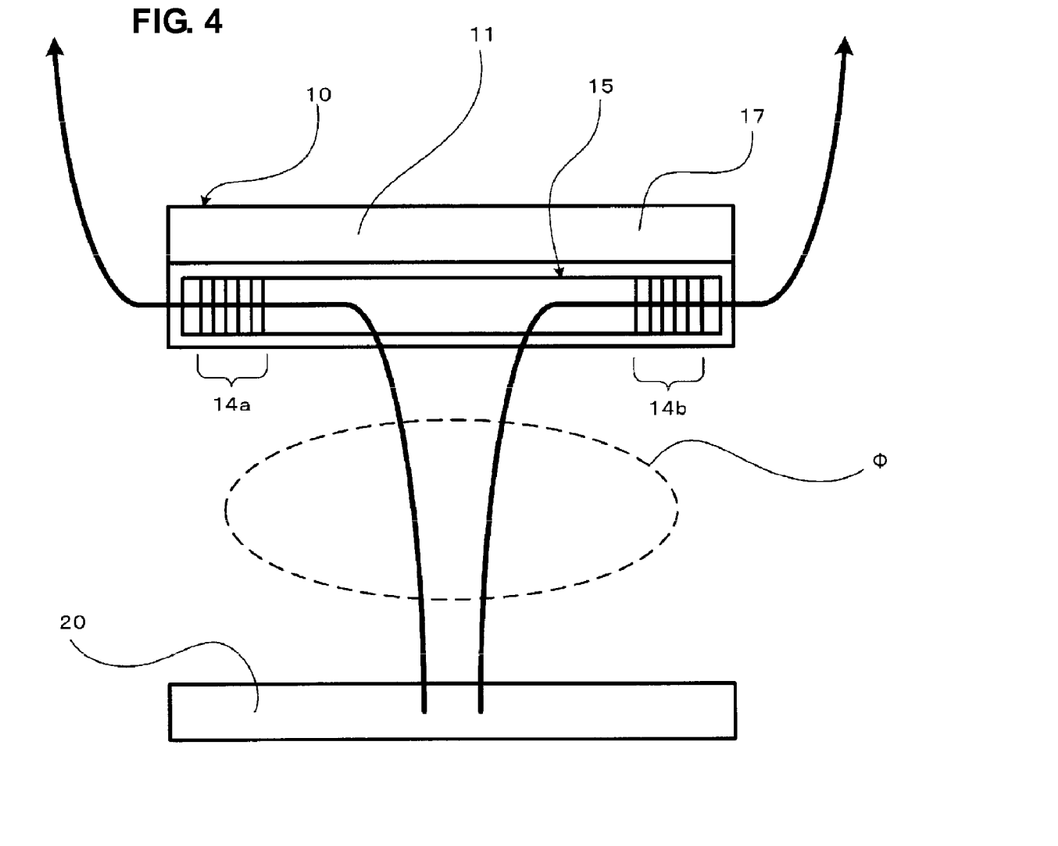
FIG. 4 is a schematic diagram illustrating a path of a magnetic flux when the antenna device illustrated in FIG. 3 is held over a reader/writer for an RFID system.

Referring to FIG. 4, the symbol φ denotes a magnetic flux generated from a reader/writer 20. When an antenna device is installed in a mobile terminal, the antenna device is usually disposed such that the circuit substrate of the antenna device is parallel or substantially parallel to the main surface of the mobile terminal. A user of the mobile terminal holds the mobile terminal over the reader/writer such that the main surface of the mobile terminal is parallel or substantially to the main surface of the reader/writer. FIG. 4 illustrates a path of a magnetic flux generated from the reader/writer 20 and the cross-sectional surface of the antenna device in the above-described usage pattern. As illustrated in FIG. 4, a magnetic flux φ generated from the reader/writer 20 enters a non-winding portion 15 between a first coil portion 14a and a second coil portion 14b in an antenna coil 11. The traveling path of the magnetic flux φ is blocked by the circuit substrate 17 disposed behind the antenna coil 11, and is changed by substantially 90° along the shape of the magnetic core 12. As a result, the magnetic flux φ passes through the first coil portion 14a and the second coil portion 14b. Thus, even if the coil axis of the antenna coil 11 is perpendicular or substantially perpendicular to the magnetic flux φ generated from the reader/writer 20, the antenna coil 11 can receive the magnetic flux φ generated from the reader/writer 20, be interlinked with the magnetic flux φ, and generate electromagnetic induction. In particular, in this preferred embodiment, the first coil portion 14a and the second coil portion 14b are arranged on the periphery of the magnetic core 12. Accordingly, the magnetic flux can pass through the coil axes of the first coil portion 14a and the second coil portion 14b, and voltages can be therefore easily induced.

Here, the width of the main surface of the circuit substrate 17 in the width direction is denoted X, and the length of the antenna coil 11 in the direction of the coil axis is denoted Y. In the antenna device 10 according to this preferred embodiment, the antenna coil 11 is mounted such that X=Y is satisfied. Based on findings obtained by the inventors, if an antenna coil is arranged on a circuit substrate such that $X \geq Y \geq 0.8X$ is satisfied, the end portions of the antenna coil in the direction of the coil axis is closer to the end portions of the circuit substrate. This reduces the level of a magnetic reluctance occurring in the end portions of the antenna coil in the direction of the coil axis. Consequently, the magnetic collection efficiency of the antenna coil can be improved, and an antenna device having high communication sensitivity can be obtained. In the second preferred embodiment, the above-described inequality is satisfied.

Furthermore, in this preferred embodiment, the main surface of the antenna coil 11 is symmetric or substantially symmetric to a centerline bisecting sides of the main surface of the antenna coil 11 in the longitudinal direction. The non-winding portion 15 is provided in the middle portion of the main surface which includes the centerline. The antenna coil 11 is preferably arranged on the circuit substrate 17 such that the end portions of the antenna coil 11 in the longitudinal direction individually overlap the end portions of the circuit substrate 17 in the width direction. Accordingly, in plan view, the non-winding portion 5 of the antenna coil 11 is arranged on a centerline bisecting sides of the main surface of the circuit substrate 17 in the width direction. When a user of a mobile terminal including the antenna device 10 holds the middle portion of the main surface of the mobile terminal over a reader/writer, the antenna device 10 can effectively receive a magnetic flux with the greatest ease.

In the antenna device 10 according to the second preferred embodiment, the antenna coil 11 is preferably fixed to the circuit substrate 17 using an adhesive, but may be fixed to the circuit substrate 17 using another suitable method. Even if the non-winding portion 5 of the antenna coil 11 is arranged on a centerline bisecting sides of the circuit substrate 17 in the longitudinal direction, effects similar to those obtained in this preferred embodiment can be obtained.

Third Preferred Embodiment

Figure 5:
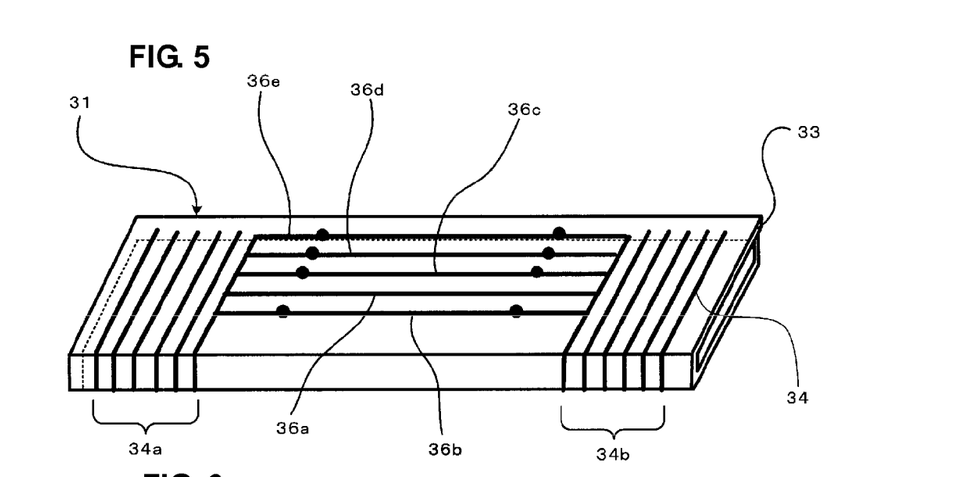
FIG. 5 is a perspective view illustrating an antenna coil according to a third preferred embodiment of the present invention.

The configuration of an antenna coil according to the third preferred embodiment will be described with reference to FIG. 5. FIG. 5 is a perspective view illustrating a configuration of an antenna coil 31 on which five connection conductors 36 are provided.

The innermost conductor in a first coil portion 34a and the innermost conductor in a second coil portion 34b are connected by five connection conductors 36a, 36b, 36c, 36d, and 36e, for example, provided on a flexible substrate 33. These connection conductors are substantially evenly spaced. The configuration of the antenna coil 31 is the same or substantially the same as that of an antenna coil according to the first preferred embodiment except that a plurality of connection conductors are included and the protrusion portion used to be connected to an input/output terminal is not included.

If four of the five connection conductors 36a, 36b, 36c, 36d, and 36e provided on the flexible substrate 33 are cut by a laser, for example, the remaining connection conductor is set as a path of a current transmitted from the first coil portion 34a or the second coil portion 34b. The setting of a path changes the length of a conductor 34. If the connection conductors 36b, 36c, 36d, and 36e are cut and the connection conductor 36a is set as a current path, the shortest length of the conductor 34 is obtained. Conversely, if the connection conductors 36a, 36b, 36c, and 36d are cut and the connection conductor 36e is set as a current path, the longest length of the conductor 34 is obtained. If the length of the conductor 34 defined by the first coil portion 34a and the second coil portion 34b is changed, the inductance value of the antenna coil 31 is also changed. If the inductance value of the antenna coil 31 is changed, the resonance frequency of a resonance circuit including the antenna coil 31 and a capacitor can be adjusted. In the antenna coil 31, a voltage is induced in accordance with the change in a magnetic flux passing through the coil portion regardless of the value of a resonance frequency. However, if a resonance frequency matches a frequency of a magnetic flux, a particularly large voltage is induced. Accordingly, a large voltage can be obtained by setting the value of a resonance frequency of a resonance circuit to a desired value. Consequently, the communication sensitivity of an antenna can be improved. By using the antenna coil 31 illustrated in FIG. 5, an inductance can be selected after the antenna coil 31 has been produced. Therefore, the communication sensitivity of the antenna can be easily improved.

In the antenna coil 31 illustrated in FIG. 5, the connection conductors 36a, 36b, 36c, 36d, and 36e are disposed in a non-winding portion in which a magnetic flux generated from a reader/writer enters. The connection conductors 36a, 36b, 36c, 36d, and 36e may block the entrance of a magnetic flux. However, since a portion in which the connection conductors 36a, 36b, 36c, 36d, and 36e are provided is extremely small in the area of the non-winding portion, a magnetic flux is likely to smoothly enter the non-winding portion.

In this preferred embodiment, the resonance frequency of a resonance circuit including the antenna coil 31 and a capacitor is controlled by cutting some of the connection conductors 36. However, preferably, the control of a resonance frequency can also be performed by providing a notch on the magnetic core. A magnetic flux that has entered the antenna coil is directed toward the first and second coil portions along the shape of the magnetic core. At that time, if the shape of the magnetic core, which functions as a path of the magnetic flux, is changed, the inductance value of the antenna coil is changed. As described previously, the resonance frequency of an antenna coil is determined in accordance with an inductance value. Accordingly, by performing trimming upon the magnetic core, a resonance frequency can be adjusted. Furthermore, trimming can be performed on the connection conductors and the magnetic core at the same time.

Fourth Preferred Embodiment

In an antenna device according to the fourth preferred embodiment of the present invention, as will be described in the following examples, antenna coil portions are provided on a circuit substrate with a gap therebetween. Furthermore, in this preferred embodiment, a shielding electrode is provided on a surface of the antenna coil that faces the circuit substrate. The configuration of an antenna coil according to the fourth preferred embodiment is the same or substantially the same as that of an antenna coil according to the first preferred embodiment except for the above-described features, and the fact that the protrusion portion used for connection to an input/output terminal is not included.

Example 1

Figure 6:
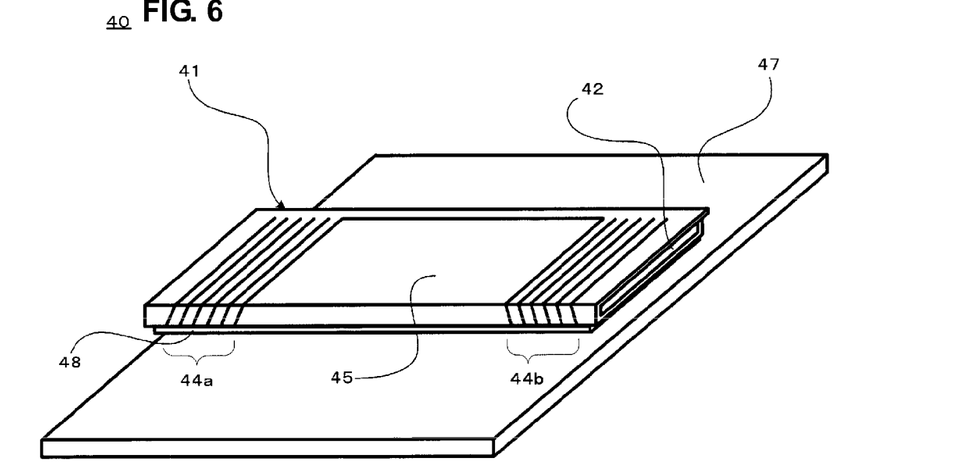
FIG. 6 is a perspective view illustrating an antenna device according to a fourth preferred embodiment of the present invention.

The configuration of an antenna device according to example 1 will be described with reference to FIG. 6. FIG. 6 is a perspective view illustrating an antenna device according to example 1.

As illustrated in FIG. 6, in an antenna device 40 according to example 1, an antenna coil 41 is provided on a circuit substrate 47 with a gap therebetween. For example, by fixing the antenna coil 41 to a casing of a mobile terminal (not illustrated), the antenna coil 41 is provided on the circuit substrate 47 with a gap therebetween. In the antenna coil 41, a shielding electrode 48 is disposed on a surface of a magnetic core 42 which faces the circuit substrate 47. The shielding electrode 48 covers a non-winding portion (not illustrated), a first coil portion 44a, and a second coil portion 44b which are provided on the surface of the magnetic core 42 which faces the circuit substrate 47. To prevent continuity between the shielding electrode 48 and each of the first coil portion 44a and the second coil portion 44b, the shielding electrode 48 is provided after a nonconductive adhesive has been applied to the first coil portion 44a and the second coil portion 44b.

For example, the circuit substrate 47 has a rectangular or substantially rectangular main surface that is preferably about 90 mm long and about 40 mm wide. The antenna coil 41 is arranged such that the sides of the antenna coil 41 in the width direction are parallel or substantially parallel to the sides of the circuit substrate 47 in the longitudinal direction. The gap between the circuit substrate 47 and the antenna coil 41 is preferably set to about 1 mm, for example.

The operation of an antenna device having the above-described configuration will be described below. With a gap between the circuit substrate 47 and the antenna coil 41, a magnetic flux that has entered a non-winding portion 45 on a main surface of the magnetic core which does not face the circuit substrate 47 may extend without changing its direction, or may be emitted from the surfaces of the first coil portion 44a and the second coil portion 44b which face the circuit substrate 47. Thus, if a magnetic flux is emitted from the surfaces facing the circuit substrate 47, it cannot pass through the first coil portion 44a and the second coil portion 44b. Accordingly, electromagnetic induction cannot be generated. Alternatively, only an extremely small voltage may be induced. However, in this preferred embodiment, the shielding electrode 48 is disposed on the surface of the magnetic core 42 which faces the circuit substrate 47. This prevents a magnetic flux that has entered the non-winding portion 45 on the main surface that does not face the circuit substrate 47 from going straight through the magnetic core 42 or from being emitted from the surfaces facing the circuit substrate 47. Accordingly, the antenna coil 41 can be interlinked with a magnetic flux transmitted from a direction perpendicular or substantially perpendicular to the main surface thereof, and a coil including the first coil portion 44a and the second coil portion 44b can therefore obtain a sufficient voltage.

Example 2

Figure 7:
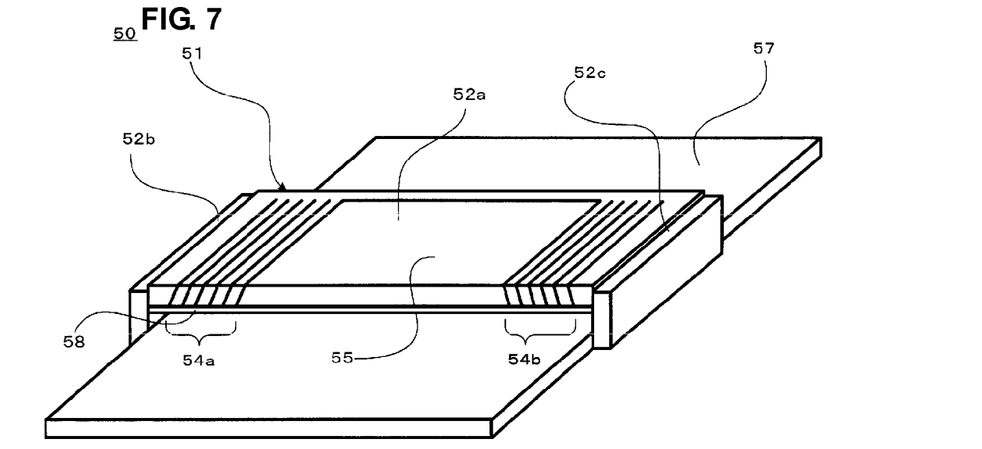
FIG. 7 is a perspective view illustrating an antenna device according to the fourth preferred embodiment of the present invention.

The configuration of an antenna device according to example 2 will be described with reference to FIG. 7. FIG. 7 is a perspective view illustrating a configuration of an antenna device according to example 2.

As illustrated in FIG. 7, in an antenna device 50 according to example 2, an antenna coil 51 is provided on a circuit substrate 57 with a gap therebetween. The antenna coil 51 is obtained by connecting one of end surfaces of a magnetic core 52a (hereinafter referred to as a first magnetic core) in the direction of its coil axis to a magnetic core 52b (hereinafter referred to as a second magnetic core) and connecting the other one of the end surfaces of the magnetic core 52a to a magnetic core 52c (hereinafter referred to as a third magnetic core). The second and third magnetic cores extend in a direction perpendicular or substantially perpendicular to the coil axis direction. The configurations of the fist magnetic core 52a and a flexible substrate have the same or substantially the same as those described in the first preferred embodiment except that the length of the fist magnetic core 52a in the longitudinal direction is preferably about 45 mm, for example, and a protrusion portion used for connection to an input/output terminal is not included. Each of the second magnetic core 52b and the third magnetic core 52c preferably has a thickness of about 3.5 mm, for example, and a rectangular or substantially rectangular main surface that is preferably about 10 mm long and about 1 mm wide, for example. The second magnetic core 52b is bonded to one of the end surfaces of the fist magnetic core 52a in the coil axis direction and the third magnetic core 52c is bonded to the other one of the end surfaces of the fist magnetic core 52a. The second magnetic core 52b is connected to the fist magnetic core 52a such that one side of the second magnetic core 52b in the longitudinal direction overlaps one side of the fist magnetic core 52a in the width direction and one side of the second magnetic core 52b in the width direction and one side of the fist magnetic core 52a in the longitudinal direction are arranged on the same or substantially the same line. A shielding electrode 58 is disposed on a surface of the fist magnetic core 52a which faces the circuit substrate 57, thereby covering the entire or substantially the entire surface of the fist magnetic core 52a.

The circuit substrate 57 has a main surface that is preferably about 90 mm long and about 45 mm wide, for example. The antenna coil 51 is arranged such that sides of the antenna coil 51 in the longitudinal direction are parallel or substantially parallel to sides of the circuit substrate 57 in the width direction. The gap between the circuit substrate 57 and the antenna coil 51 is preferably set to about 1 mm, for example. By providing the antenna coil 51 on the circuit substrate 57 as described above, the second magnetic core 52b and the third magnetic core 52c, which are individually connected to the end surfaces of the antenna coil 51 in the coil axis direction, are individually arranged along the side surfaces of the circuit substrate 57.

In the antenna device 50 using the above-described configuration, a magnetic flux that has entered a non-winding portion of the antenna coil 51 passes through a first coil portion 54a and a second coil portion 54b. The shielding electrode 58 is disposed on the fist magnetic core 52a. Accordingly, even if there is a gap between the antenna coil 51 and the circuit substrate 57, a situation in which the magnetic flux is emitted without passing through the first coil portion 54a and the second coil portion 54b can be prevented. The magnetic flux that has passed through the first coil portion 54a and the second coil portion 54b enters the second magnetic core 52b and the third magnetic core 52c, which are connected to the fist magnetic core 52a, and is then emitted from the side surfaces or end surfaces of the second magnetic core 52b and the third magnetic core 52c.

In this preferred embodiment, the second magnetic core 52b and the third magnetic core 52c are disposed at end portions of the antenna coil 51. Accordingly, a magnetic reluctance is reduced at the end portions. This increases the number of magnetic fluxes passing through the first coil portion 54a and the second coil portion 54b. A large voltage is therefore induced. Consequently, communication with higher sensitivity can be achieved.

In this preferred embodiment, each of the second magnetic core 52b and the third magnetic core 52c, which are connected to the fist magnetic core 52a, is a rectangular or substantially rectangular parallelepiped, but may have another suitable shape, such as a shape with curved side surfaces, for example. Even with such a shape, similar effects and advantages are obtained. The second magnetic core 52b and the third magnetic core 52c may not be connected to the fist magnetic core 52a. Instead, the fist magnetic core 52a, the second magnetic core 52b, and the third magnetic core 52c may preferably be integrated. Furthermore, a shielding electrode may also be disposed on surfaces of the second magnetic core 52b and the third magnetic core 52c that face the circuit substrate 57.

In this preferred embodiment, there is a gap between the antenna coil 41 and the circuit substrate 47 and a gap between the antenna coil 51 and the circuit substrate 57. Such a configuration increases the design flexibility for the circuit substrate 47 and the circuit substrate 57. As described above, by disposing the shielding electrode 48 or 58 on the surface of the antenna coil 41 or 51 which faces the circuit substrate 47 or 57, even if there is a gap between the antenna coil 41 or 51 and the circuit substrate 47 or 57, an antenna device can communicate with a reader/writer with high sensitivity.

Accordingly, if the antenna device 40 including the antenna coil 41 and the circuit substrate 47 or the antenna device 50 including the antenna coil 51 and the circuit substrate 57 is installed in a mobile terminal, the antenna coil 41 or 51 can be bonded to the casing of the mobile terminal so as to obtain a gap between the antenna coil and a circuit substrate. If the antenna device 40 or 50 is installed in a folding type mobile terminal including a main casing and a sub-casing, the circuit substrate 47 or 57 can be included in the main casing and the antenna coil 41 or 51 can be included in the sub-casing. In this case, when viewed from a reader/writer in a state in which the main casing and the sub-casing are folded, the circuit substrate 47 or 57 is disposed behind the antenna coil 41 or 51. Thus, by providing the antenna coil 41 including the shielding electrode 48 or the antenna coil 51 including the shielding electrode 58 on the circuit substrate 47 or 57 with a gap therebetween, the design flexibility for a location in the mobile terminal at which the antenna device 40 or 50 is to be installed can be increased. In this preferred embodiment, the shielding electrode 48 or 58 is disposed on the surface of the fist magnetic core 42a or 52a which faces the circuit substrate 47 or 57, such that it covers the non-winding portion 45 or 55, the first coil portion 44a or 54a, and the second coil portion 44b or 54b. However, the shielding electrode 48 or 58 may preferably be arranged only to cover the non-winding portion 45 or 55, or may preferably be arranged only to cover the first coil portion 44a or 54a and the second coil portion 44b or 54b.

Fifth Preferred Embodiment

Figure 8:
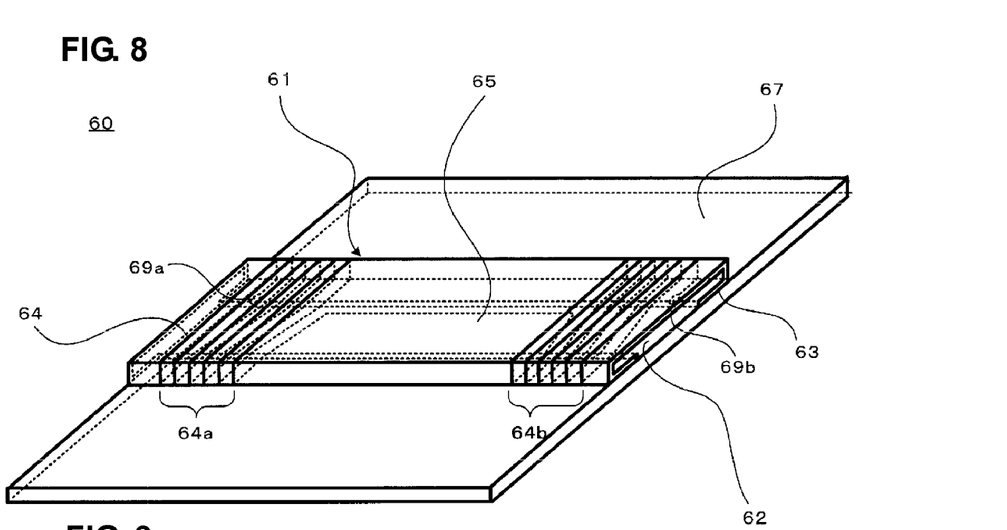
FIG. 8 is a perspective view illustrating an antenna device according to a fifth preferred embodiment of the present invention.
Figure 9:
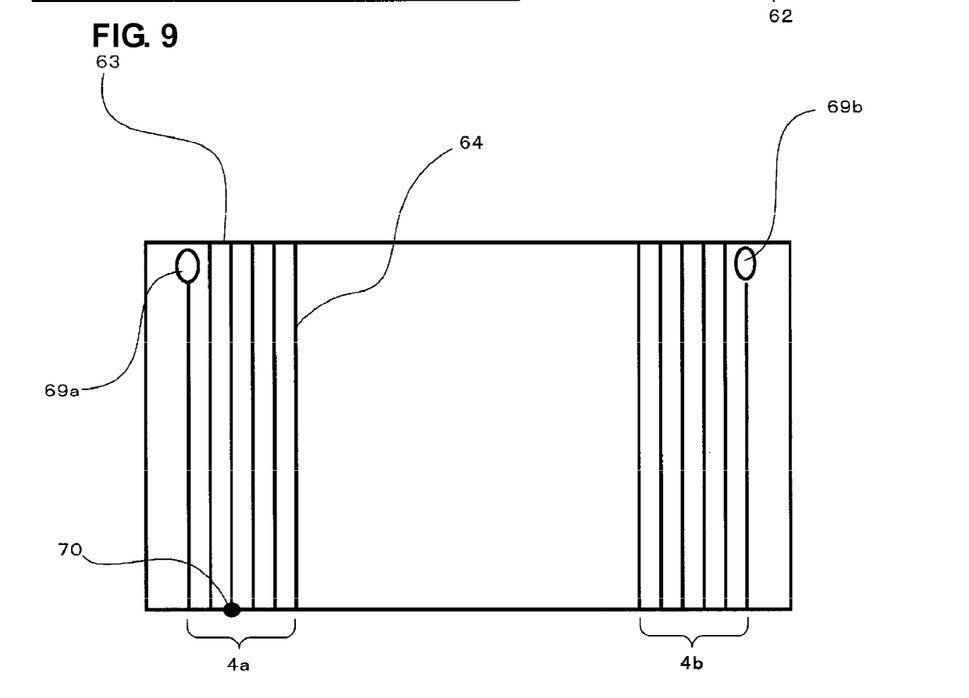
FIG. 9 is a plan view illustrating a flexible substrate according to the fifth preferred embodiment of the present invention.
Figure 10:
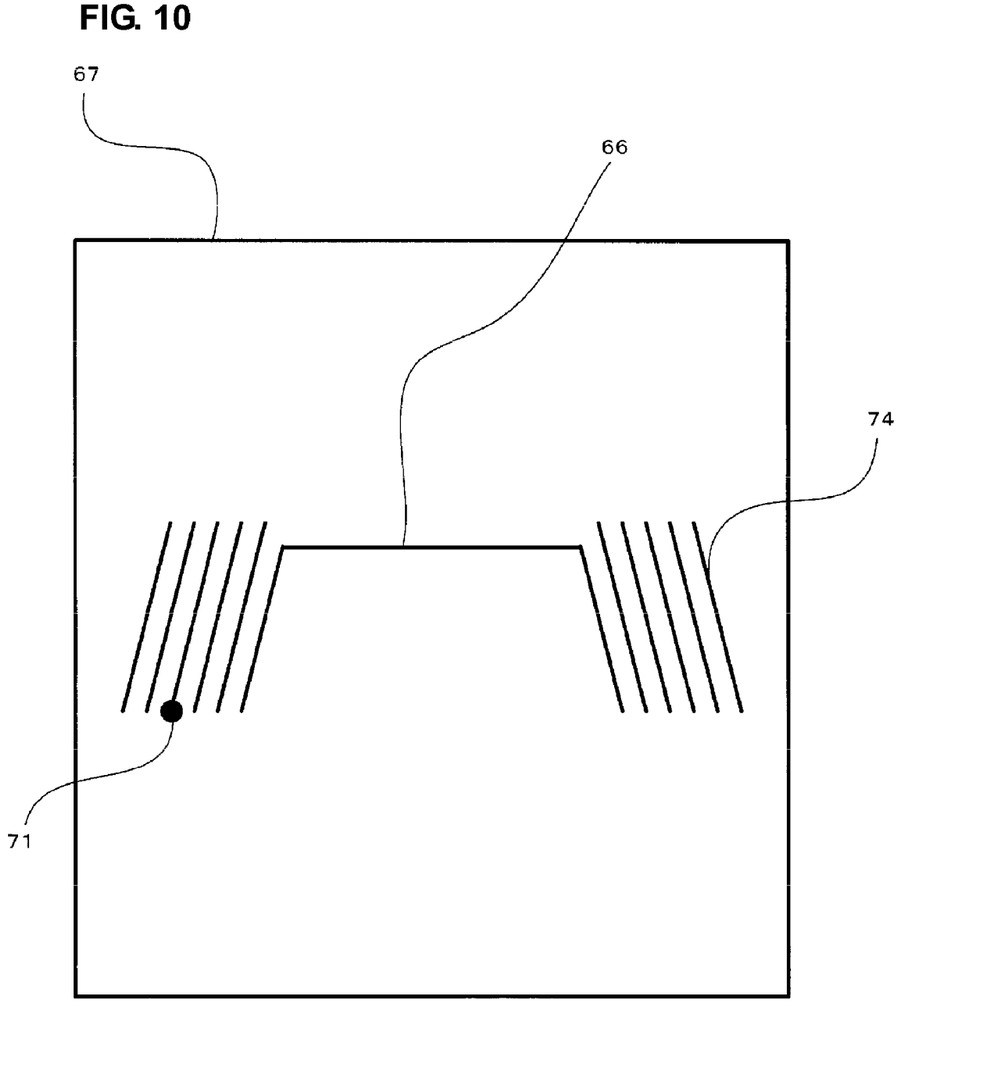
FIG. 10 is a plan view illustrating a circuit substrate according to the fifth preferred embodiment of the present invention.

The configuration of an antenna device according to the fifth preferred embodiment of the present invention will be described with reference to FIGS. 8 to 10. FIG. 8 is a perspective view illustrating an antenna device according to the fifth preferred embodiment. FIG. 9 is a plan view illustrating a flexible substrate according to the fifth preferred embodiment. FIG. 10 is a plan view illustrating a circuit substrate according to the fifth preferred embodiment. In this preferred embodiment, a coil portion includes a conductor provided on the flexible substrate and a conductor provided on the circuit substrate.

As illustrated in FIG. 8, in an antenna device 60 according to the fifth preferred embodiment, an antenna coil 61 is boded to a circuit substrate 67 such that the main surface of the circuit substrate 67 faces the main surface of the antenna coil 61. The antenna coil 61 includes a first coil portion 64a, a second coil portion 64b, and a non-winding portion 65 that includes no conductors and is disposed between the first coil portion 64a and the second coil portion 64b on the main surface thereof. On the side surface of the antenna coil 61 in the direction of coil axes of the first coil portion 64a and the second coil portion 64b, no conductors are provided.

FIG. 9 illustrates the configuration of a flexible substrate 63 before the flexible substrate 63 is wound around a magnetic core. On the flexible substrate 63, six conductors 64 are preferably provided on either side in the longitudinal. The conductors 64 excluding the two conductors 64 adjacent to the left side and the right side are connected to the upper and lower ends of the flexible substrate 63. The two conductors, which are individually arranged near the left side and right side of the flexible substrate 63, individually include terminals 69a and 69b arranged to be connected to an input/output terminal. The flexible substrate 63 having the above-described configuration is wound around the magnetic core 62 with its surface on which the conductors 64 are provided outside such that it covers a main surface, two side surfaces, and a portion of an opposite main surface of a magnetic core 62.

FIG. 10 illustrates the configuration of the circuit substrate 67 before an antenna coil is mounted on the circuit substrate 67. On the circuit substrate 67, six conductors 74 are preferably also provided on either side. Among the conductors 74, the two innermost conductors are connected to each other by a connection conductor 66 provided on the circuit substrate 67. On the circuit substrate 67 having the above-described configuration, the antenna coil 61 preferably is bonded such that an end portion (for example, a point 71) of one of the conductors 74 provided on the circuit substrate 67 and an end portion (for example, a point 70) of one of the conductors 64 provided on the flexible substrate overlap. Consequently, a single coil including the first coil portion 64a and the second coil portion 64b is provided.

Even with the antenna device 60 having the above-described configuration, the antenna coil 61 including the first coil portion 64a, the second coil portion 64b, and the non-winding portion 65 therebetween can be produced and the antenna device 60 can be smoothly interlinked with a magnetic flux traveling in a direction perpendicular or substantially perpendicular to the main surface of the antenna coil 61. Accordingly, communication with high sensitivity can be achieved.

By using a method of forming the first coil portion 64a and the second coil portion 64b by connecting the conductors 74 formed on the circuit substrate 67 to the conductors 64 formed on the flexible substrate 63, it is not necessary to electrically connect end portions of these conductors formed on the flexible substrate 63 by soldering. Accordingly, the number of process steps required for the production of an antenna device can be reduced, and an antenna device can be more easily produced at a reduced cost.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An antenna device comprising:
    an antenna coil including:
        a planar magnetic core;
        a flexible substrate having a surface on which conductors are provided and being wound around the magnetic core;
        a first coil portion defined by a first plurality of the conductors and having a coil axis substantially parallel to a main surface of the magnetic core;
        a second coil portion defined by a second plurality of the conductors, having a coil axis substantially parallel to the main surface of the magnetic core, being connected to the first coil portion, and having a winding direction opposite to that of the first coil portion; and
        a non-winding portion provided between the first coil portion and the second coil portion on the main surface of the magnetic core and including none of the conductors; and
    a circuit substrate on which the antenna coil is mounted; wherein
    a main surface of the antenna coil faces a main surface of the circuit substrate; and
    the antenna coil is arranged such that an end portion of the first coil portion and an end portion of the second coil portion that are disposed on opposite sides of the non-winding portion are located at or adjacent to two opposite end portions of the circuit substrate.

2. The antenna device according to claim 1, wherein at least a middle portion on the main surface of the magnetic core is the non-winding portion.

3. The antenna device according to claim 1, wherein none of the conductors are provided on a side surface of the magnetic core which is disposed in a direction in which the first coil portion and the second coil portion are arranged.

4. The antenna device according to claim 1, wherein another magnetic core is arranged at least one of the side surfaces of the magnetic core which are disposed in a direction in which the first coil portion and the second coil portion are arranged.

5. The antenna device according to claim 1, wherein the coil axis of the first coil portion and the coil axis of the second coil portion are substantially the same.

6. The antenna device according to claim 1, wherein a shielding electrode is disposed on at least a portion of a main surface of the magnetic core.

7. The antenna device according to claim 1, wherein the first coil portion and the second coil portion are connected to each other by a connection conductor that is defined by one of the conductors.

8. The antenna device according to claim 7, wherein at least two of the connection conductors are provided.

9. The antenna device according to claim 8, wherein each of the at least two connection conductors includes a notch portion.

10. The antenna device according to claim 1, wherein the magnetic core includes at least one notch portion.

11. The antenna device according to claim 1, wherein, when a length of the antenna coil in a direction in which a first coil portion and a second coil portion are arranged is denoted X and a length of the circuit substrate in the direction in which the first coil portion and the second coil portion are arranged is denoted Y, inequality $Y \geq X \geq 0.8Y$ is satisfied.

12. The antenna device according to claim 1, wherein a non-winding portion of the antenna coil is located on at least one of centerlines that bisect sides of the main surface of the circuit substrate.

13. The antenna device according to claim 1, wherein additional conductors are provided on the main surface of the circuit substrate.

* * * * *